United States Patent
Lohberg et al.

(10) Patent No.: US 7,830,278 B2
(45) Date of Patent: Nov. 9, 2010

(54) SENSOR ARRANGEMENT FOR THE PRECISE DETECTION OF RELATIVE MOVEMENTS BETWEEN AN ENCODER AND A SENSOR

(75) Inventors: Peter Lohberg, Friedrichsdorf (DE); Klaus Rink, Rodenbach (DE)

(73) Assignee: Continental Teves AG & Co. oHG (DE)

( * ) Notice: Subject to any disclaimer, the term of this patent is extended or adjusted under 35 U.S.C. 154(b) by 28 days.

(21) Appl. No.: 12/375,081

(22) PCT Filed: Aug. 1, 2007

(86) PCT No.: PCT/EP2007/057954
§ 371 (c)(1),
(2), (4) Date: Jan. 26, 2009

(87) PCT Pub. No.: WO2008/015229
PCT Pub. Date: Feb. 7, 2008

(65) Prior Publication Data
US 2009/0278711 A1    Nov. 12, 2009

(30) Foreign Application Priority Data
Aug. 1, 2006  (DE) .................. 10 2006 036 196
Aug. 1, 2007  (DE) .................. 10 2007 036 463

(51) Int. Cl.
*H03M 1/22*    (2006.01)
(52) U.S. Cl. .................................. 341/11; 341/155
(58) Field of Classification Search .............. 341/11, 341/155; 73/861.77, 488; 324/165, 202, 324/251, 252, 207.21, 166, 207.22, 207.25
See application file for complete search history.

(56) References Cited

U.S. PATENT DOCUMENTS

| | | | | |
|---|---|---|---|---|
| 4,259,637 A | * | 3/1981 | Bloomfield et al. | 324/166 |
| 4,785,241 A | * | 11/1988 | Abiko et al. | 324/207.21 |
| 4,788,528 A | * | 11/1988 | Elmqvist | 341/155 |
| 4,914,387 A | * | 4/1990 | Santos | 324/166 |
| 5,500,585 A | * | 3/1996 | Aab | 324/165 |
| 5,955,878 A | * | 9/1999 | Peilloud et al. | 324/165 |
| 6,242,905 B1 | * | 6/2001 | Draxelmayr | 324/165 |

(Continued)

FOREIGN PATENT DOCUMENTS

AT    385 853 B    5/1988

(Continued)

*Primary Examiner*—Jean B Jeanglaude
(74) *Attorney, Agent, or Firm*—RatnerPrestia (57) ABSTRACT

A sensor arrangement and a method for the precise detection of relative movements between an encoder and a sensor, including an encoder, which has an incremental scale having a plurality of scale subdivisions ($\lambda$), and a sensor which is magnetically coupled to the encoder via an air gap and includes at least two magnetic field sensor elements (SE1, SE2) which are arranged offset with respect to one another by a defined distance ($\Delta x$) in the direction of the relative movement, the magnetic field sensor element output signals ($V_1$, $V_2$) having been shifted relative to one another by a relative-speed-dependent time difference with regard to the detection of a scale subdivision ($\lambda$) or a defined part of a scale subdivision (N,S), the sensor having a signal processing circuit which comprises an interface module which generates a sensor output signal ($I_{S3}, I_{S4}$) including at least one speed signal based upon the time difference.

15 Claims, 8 Drawing Sheets

U.S. PATENT DOCUMENTS

| | | | |
|---|---|---|---|
| 6,252,535 B1 * | 6/2001 | Kober et al. | 341/155 |
| 6,259,249 B1 * | 7/2001 | Miyata | 324/207.17 |
| 6,282,954 B1 * | 9/2001 | Ott et al. | 73/488 |
| 6,304,074 B1 * | 10/2001 | Waffenschmidt | 324/202 |
| 6,313,777 B1 * | 11/2001 | Horvat et al. | 341/144 |
| 6,339,322 B1 | 1/2002 | Loreck et al. | |
| 6,363,795 B1 * | 4/2002 | Bergqvist et al. | 73/861.77 |
| 6,466,010 B1 * | 10/2002 | Moerbe | 324/207.21 |
| 6,492,807 B2 * | 12/2002 | Spellman | 324/207.22 |
| 6,518,908 B2 * | 2/2003 | Boehm et al. | 341/155 |
| 6,585,070 B1 * | 7/2003 | Hessmert et al. | 180/197 |
| 6,734,788 B1 * | 5/2004 | Winner | 340/426.1 |
| 2001/0009367 A1 | 7/2001 | Seitzer et al. | |
| 2004/0100251 A1 | 5/2004 | Lohberg | |

FOREIGN PATENT DOCUMENTS

| | | |
|---|---|---|
| DE | 2753738 A1 | 6/1979 |
| DE | 196 34 715 A1 | 3/1998 |
| DE | 199 08 361 A1 | 9/2000 |
| DE | 101 50 760 A1 | 8/2002 |
| DE | 10 2004 039 739 A1 | 2/2006 |
| JP | 2004-333436 | 11/2004 |
| WO | WO 2006/1 22 945 A1 | 11/2006 |

* cited by examiner

SENSOR ARRANGEMENT FOR THE PRECISE DETECTION OF RELATIVE MOVEMENTS BETWEEN AN ENCODER AND A SENSOR

CROSS REFERENCE TO RELATED APPLICATIONS

This application is the U.S. national phase application of PCT International Application No. PCT/EP2007/057954 filed Aug. 1, 2007, which claims priority to German Patent Application No. DE102006036196.2, filed Aug. 1, 2006 and German Patent Application No. DE102007036463.8, filed Aug. 1, 2007, the contents of such applications being incorporated by reference herein.

BACKGROUND OF THE INVENTION

1. Field of the Invention

The invention relates to a sensor arrangement, to a method for the precise detection of relative movements between an encoder and a sensor, and to the use of the sensor arrangement as a wheel rotational speed detection system in motor vehicles.

2. Description of the Related Art

Document US 2006/0069523 A1 proposes a rotational speed sensor arrangement comprising an incremental encoder and a sensor, the sensor having two magnetic field sensor elements which are arranged such that they are offset with respect to one another in the direction of movement of the encoder. The magnetic field sensor element output signals which have been shifted relative to one another by a time difference with regard to the detection of a scale subdivision are transmitted to an electronic control unit in which the rotational speed or speed of rotation of the encoder is calculated from this time difference. This is disadvantageous insofar as the magnetic field sensor element output signals are transmitted to the electronic control unit without signal conditioning or signal processing, as a result of which two separate output signals which are also each susceptible to interference to a relatively large extent have to be transmitted.

SUMMARY OF THE INVENTION

The invention relates to a sensor arrangement having an improved output signal which is relatively robust with respect to interfering influences, in particular.

The invention also relates to the concept of the sensor comprising a signal processing circuit in which a common speed signal or speed signal pattern is generated from the at least two magnetic field sensor element output signals, in particular using an interface module.

Detecting movement using the at least two magnetic field sensor elements, which are arranged such that they are offset in the direction of movement, and the resultant relative-speed-dependent time difference between the magnetic field sensor element output signals makes it possible to detect the speed in a relatively precise manner and in a manner which is essentially independent of scale subdivision errors of the encoder. For this reason, it is possible to use relatively cost-effective encoders with a scale subdivision error which is relatively large on average, the production precision of which encoders would otherwise not suffice.

An encoder having an incremental scale is preferably understood as meaning both an encoder having a magnetic scale comprising a sequence, in particular an integer sequence, of alternating, permanently magnetized north/south pole areas and a means, in particular a ferromagnetic means, which influences a magnetic field, in combination with a magnet, for example a gear, a rack or a corresponding perforated disk. The encoder is particularly preferably used as a pulse generator inside the sensor arrangement.

The scale of the encoder is preferably alternatively designed to detect rotational or translational relative movements between the encoder and the sensor, the scale being circular or straight, in particular.

A relative movement between the encoder and the sensor is expediently understood as meaning a movement of the encoder relative to a permanently positioned sensor. However, it may preferably also be alternatively understood as meaning a movement of the sensor relative to a stationary encoder or a combined movement.

A scale subdivision is preferably understood as meaning a subdivision period or single subdivision or pole pitch of the scale, for example comprising a north/south pole pair or a tooth/gap pair. In this case, a defined part of a scale subdivision is understood as meaning, in particular, an individual north or south pole zone or an individual tooth or an individual gap. Such a scale subdivision is particularly preferably broken down into further, finer parts taking into account the magnetic field surrounding it, which parts are very particularly preferably detected by interpolating the magnetic field sensor element output signals, for example with regard to the detected angle or the detected field strength of the magnetic field, and are assigned to the sensor signal components.

A magnetic field sensor element is preferably understood as meaning a magnetoelectrical transducer element, such as an AMR element, a GMR element, another magnetoresistive sensor element or a Hall element.

The magnetic field sensor elements are preferably used as field probes during weak field operation and are arranged accordingly with respect to the encoder. This has the advantage that the air gap need not be kept very small, as is necessary for strong field operation, for example.

With regard to the scale subdivisions, the scale of the encoder is expediently provided with a pattern which is used to code the positions of the individual scale subdivisions or groups of scale subdivisions. This pattern is stored in an electronic control unit, in particular.

A scale subdivision error of an encoder is preferably understood as meaning the tolerances of the incremental scale which are expressed, for example, in irregularities in the scale subdivision lengths. The term scale subdivision error corresponds, in particular, to the terms pole pitch error, single subdivision error and individual subdivision error.

An imaging error is preferably understood as meaning an encoder or scale subdivision imaging error which is detected by the sensor and results with regard to the detection of encoder movements or relative movements between the encoder and the sensor by means of a sensor, which is magnetically coupled to the encoder, via an air gap of a particular length. In this case, the scale subdivisions of the encoder appear to be indistinct to the sensor on the basis of the air gap length. The indistinctness is particularly preferably expressed as noise with which the magnetic field sensor element output signals are encumbered with regard to the detection of scale subdivisions or defined parts of the latter.

On account of the incremental scale, the sensor output signal or the speed signal is preferably essentially periodic.

The sensor output signal and the speed signal are preferably the same signal.

Alternatively, the speed signal preferably comprises at least the first counting pulse and the second, lagging counting pulse, which have been shifted relative to one another on the basis of the relative-speed-dependent time difference, or the individual counting pulse whose duration depends on the relative-speed-dependent time difference, this speed signal being part of the sensor output signal.

The relative speed between the encoder and the sensor or the corresponding relative speed information is preferably coded by means of the speed signal or the speed signal pattern. Depending on the design and use of the sensor arrangement, this relative speed is a translational speed or a rotational speed, for example an angular velocity or a rotational speed. In the case of the detection of a rotational speed and a corresponding design of the sensor arrangement, angular positions or angles of rotation are assigned to the scale subdivisions or angular subdivisions, in particular.

It is preferable for the incremental scale of the encoder to have at least one scale subdivision of a defined length for coding an item of position information, this defined length differing from the length of other scale subdivisions of the encoder. Such a particular scale subdivision of a defined length can be used, for example, as a reference position of the encoder scale.

The sensor arrangement is preferably connected to an electronic control unit by means of at least two lines and, in particular, is supplied with power by means of these two lines. The sensor is accordingly in the form of an active sensor.

The lengths of the scale subdivisions are expediently different depending on the location, in particular are clearly different, in the direction of movement of the encoder. As a result, the positions of the individual scale subdivisions are coded, in particular are clearly coded, by means of their respective length. A plurality of scale subdivisions, very particularly preferably a plurality of groups of scale subdivisions, particularly preferably have essentially the same length. Alternatively, the lengths of the scale subdivisions are particularly preferably designed essentially according to a continuous function, very particularly preferably according to a trigonometric function, in the direction of relative movement or along the scale profile. Advantageous position codings can be achieved by the above designs of the encoder scale.

It is preferable for the signal processing circuit of the sensor arrangement to comprise a signal conditioning unit which generates at least one respective movement signal from the magnetic field sensor element output signals and, in particular, generates at least one of the following items of additional information from at least one of the magnetic field sensor element output signals and provides it for further processing:
  an item of movement direction information,
  an item of information relating to the magnetic field strength in the air gap, which comprises an item of position information, for example, and/or
  a self-diagnosis parameter, for example an item of information relating to the occurrence of a fault which is referred to as "flipping".

The movement signals are conditioned and/or amplified, in particular, with respect to the magnetic field sensor element output signals and, following signal conditioning, particularly preferably each comprise a pulse of a defined amplitude and pulse duration, the pulses having been shifted with respect to one another by the relative-speed-dependent time difference in the two signal conditioning channels which are each assigned to a magnetic field sensor element.

The interface module expediently comprises a modulator and at least one current source, the modulator driving the at least one current source at least on the basis of the movement signals and generating the sensor output signal in the form of an essentially periodic injected current signal. The latter has two counting pulses for each signal period, which counting pulses are each generated, in particular, from the movement signals in a counting pulse unit and the temporal offset of which or the phase shift of which with respect to one another, from the rising edge of the first counting pulse to the rising edge of the second counting pulse, depends, in particular in a linear manner, on the relative-speed-dependent time difference between the magnetic field sensor element output signals and/or particularly preferably corresponds to said time difference. The above signal form is an advantageous form of the speed signal of the sensor output signal and can be decoded in a relatively reliable manner in an evaluation unit or electronic control unit. It is also been found that signals in the form of injected currents are particularly robust with respect to interference. The signal processing circuit particularly preferably has a movement direction unit which drives the modulator of the interface module on the basis of the movement direction information provided by the signal conditioning unit in such a manner that the additional information signal generated from at least one item of additional information in an additional information unit always follows the second, lagging counting pulse at a defined interval of time irrespective of the relative direction of movement or the direction of movement of the encoder and irrespective of the order, which is generated thereby, of the two counting pulses originally generated from the magnetic field sensor element output signals. The movement direction unit is therefore used to drive the modulator in such a manner that the additional information signal always follows the second, lagging counting pulse and not the first counting pulse irrespective of the relative direction of movement, the first counting pulse and, accordingly, the second, lagging counting pulse being generated either from the first or the second magnetic field sensor element output signal. This avoids the additional information signal following the first counting pulse and possibly being clipped by the lagging, second counting pulse. This is because the interval of time between the second counting pulse and the counting pulse of the following signal period or the pulse pause following the second counting pulse is very particularly preferably considerably longer than the interval of time between the two counting pulses of one signal period.

Alternatively, the movement direction unit can preferably be used to attach or modulate any additional data onto the leading or lagging counting pulse in a targeted manner.

Alternatively, the interface module preferably comprises a modulator and at least one current source, the modulator driving the at least one current source at least on the basis of the movement information and generating the sensor output signal in the form of an essentially periodic injected current signal having an individual counting pulse for each signal period, the time duration of said counting pulse depending, in particular in a linear manner, on the relative-speed-dependent time difference between the magnetic field sensor element output signals and/or particularly preferably corresponding to said time difference. This form of the sensor output signal or speed signal is particularly robust and can be decoded in an evaluation unit or electronic control unit in a simple and reliable manner.

It is expedient for the sensor to have an additional input for receiving additional signals, for example a lining wear signal. This makes it possible to transmit signals from further sensors to the electronic control unit using the interface module, this being possible using a common data protocol and not necessitating any additional lines to the electronic control unit.

The signal processing circuit preferably comprises an additional information unit in which an additional information signal is generated from the additional information provided by the signal conditioning unit and/or from the additional information of the additional input. The additional information is in the form of binary data, in particular, and the additional information signal particularly preferably has a form of a string of pulses or pulse pauses of a defined time duration and a defined amplitude, which respectively codes one information bit of the additional information. The pulses or additional information pulses of the additional information signal very particularly preferably have Manchester coding.

The interface module preferably additionally generates the sensor output signal on the basis of the respective scale subdivision length, the signal period being a measure of the respectively detected encoder position or relative position. This makes it possible to simultaneously transmit a position signal in a robust and reliable manner. In particular, the signal period automatically results from the scale subdivision length and does not require any additional signal influencing or signal processing in order to achieve this.

The interface module expediently additionally generates the sensor output signal on the basis of at least one item of additional information and/or the additional information signal. In this case, additional information pulses of a defined time duration or additional information pulse pauses of a defined time duration are generated at defined times for each signal period on the basis of the binary value of the additional information in the pulse pause between the individual counting pulse and the individual counting pulse of the following signal period or in the pulse pause between the second counting pulse and the first counting pulse of the following signal period. In this case, the amplitude of the additional information pulses differs from the amplitude of the counting pulses, in particular.

The at least two magnetic field sensor elements are preferably anisotropic magnetoresistive sensor elements and the sensor additionally has at least one bias magnet, in which case, with reference to a spatial or three-axis Cartesian coordinate system, that scale area or surface of the encoder which is detected by the sensor is arranged essentially parallel to the x-y plane, the magnetization direction of the bias magnet is arranged essentially parallel to the x-axis, and the respective sensor area of the magnetic field sensor elements is arranged essentially parallel to the x-y plane, the magnetic field sensor elements being arranged at a distance from the scale surface which is different in the z-direction. This makes it possible to detect a fault in one of the magnetic field sensor elements which is referred to as "flipping" and would result in the magnetic field sensor element output signal from the faulty element being doubled. This is detected, in particular, by comparing the frequencies of the two magnetic field sensor element output signals using the signal processing circuit. "Flipping" is present when a different frequency is detected. For this purpose, the signal processing circuit particularly preferably has suitable circuit means, as proposed in document WO 2006/122945 A1, for example.

As part of the method, it is expedient for the sensor output signal to be transmitted, in the form of an injected current signal, to an electronic control unit to which the sensor is connected by means of at least two lines. In this case, the sensor is particularly preferably supplied with electrical power by means of these two lines.

The method is preferably supplemented, the speed signal pattern for a respective signal period being formed by virtue of the fact that, when a first defined amplitude threshold and a second defined amplitude threshold are exceeded and undershot in direct succession by a respective one of the magnetic field sensor element output signals with respect to the relative-speed-dependent time difference, a first counting pulse and a lagging, second counting pulse each with a defined amplitude, in particular a defined first amplitude, and a defined duration are generated by the signal processing circuit. In this case, the first counting pulse is assigned to one magnetic field sensor element output signal and the second, lagging counting pulse is assigned to the other magnetic field sensor element output signal.

Alternatively, the speed signal pattern for a respective signal period is generated by virtue of the fact that, when a first defined amplitude threshold and a second defined amplitude threshold are exceeded and undershot in direct succession by a respective one of the magnetic field sensor element output signals with respect to the relative-speed-dependent time difference, an individual counting pulse of a defined first amplitude and with the duration of the interval of time, limited by the two defined amplitude thresholds being undershot and exceeded in this manner, is generated by the signal processing circuit.

It is preferable for additional information or at least one item of additional information, for example an item of movement direction information, an item of information relating to the magnetic field strength in the air gap and/or a self-diagnosis parameter, for example the occurrence of a fault which is referred to as "flipping", to be obtained from at least one of the magnetic field sensor element output signals in the signal processing circuit. This information is coded, in particular respectively, in the form of at least one additional information bit, these additional information bits being respectively coded, once for each signal period, in the form of successive additional information pulses with a defined second amplitude and a defined time duration or in the form of corresponding additional information pulse pauses in a pulse pause following the lagging, second counting pulse or following the individual counting pulse.

The relative speed between the encoder and the sensor is expediently respectively calculated in the electronic control unit, for each signal period of the sensor output signal, from the temporal offset between the first counting pulse and the lagging, second counting pulse or from the time duration of the individual counting pulse. The corresponding scale subdivision or the scale subdivision which can be assigned to this period or the corresponding scale subdivision segment of the encoder is additionally identified in the electronic control unit, in particular, from the respective period duration of the sensor output signal, and an item of position information, in particular, is generated. This item of position information is particularly preferably assigned a travel value or an angle value.

The sensor preferably detects the magnetic field strength, in particular the mean magnetic field strength, in the air gap and transmits it, in particular in the form of additional information, to the electronic control unit in which the imaging error of the scale subdivision, with which the sensor output signal is respectively encumbered with respect to one period, is then determined from the mean magnetic field strength in the air gap and the evaluation of a reference characteristic curve which is stored electronically and indicates the relationship between the standardized air gap length and the imaging error and the standardized field strength, after which, in particular, the respective period duration of the sensor output signal is evaluated in order to generate and/or calculate an item of position information taking into account the imaging error. A method for determining the imaging error in the magnetic air gap of a wheel rotational speed detection system, as proposed in document WO 2007/057429 A1, is particularly preferably carried out, in particular in the form of one of the developments described therein.

An item of position information is expediently determined, jointly or additionally, from the period duration of the sensor output signal and the magnetic field strength, the magnetic field strength, in particular the mean magnetic field strength, being a measure of the scale subdivision length. This makes it possible to form a mean value and/or carry out a plausibility check while determining the scale subdivision length or the resultant position information.

The sensor arrangement is preferably in the form of a wheel rotational speed detection system, a method for indirectly detecting a loss of tire pressure, which has recourse to the sensor output signal, being carried out in the electronic control unit. On account of the particularly precise speed signal, this makes it possible to increase the reliability and accuracy of a method for indirectly detecting a loss of tire pressure.

The magnetic field sensor elements and/or the signal processing circuit are preferably arranged on a common chip.

It is expedient for the sensor arrangement according to aspects of the invention and the method according to aspects of the invention to be used to double the local sampling rate or to double the signal period based on the scale subdivisions detected.

An encoder having a number of scale subdivisions which is reduced, in particular is essentially halved, in comparison with an encoder that is customary for the respective application is preferably used in the sensor arrangement or while carrying out the method. This is expedient since a particularly precise item of speed information is provided according to aspects of the invention, and so it is not absolutely necessary to determine the speed by evaluating a plurality of signal periods. The use of an encoder as described above has the advantages of a higher or doubled magnetic field strength and a considerable reduction in signal jitter. In addition, this results in the period duration of the sensor output signal being lengthened or doubled, as a result of which complete transmission of the additional information is still guaranteed even in the case of relatively high speeds when used as a wheel rotational speed detection system in a motor vehicle without the first or individual counting pulse of the respectively following period "clipping" the additional information pulses or being superimposed on the latter.

It is preferable for each second period of the sensor output signal to be suppressed on the sensor side, as a result of which an essentially doubled pulse pause duration is likewise available for transmitting the additional information and the above-described "clipping" of the additional information pulses by the following counting pulse is thus reliably avoided.

The invention also relates to the use of the sensor arrangement in motor vehicles and to a use, in particular, as a wheel rotational speed detection system, as a sensor arrangement for detecting the rotational speed in a transmission or motor or for measuring lateral speeds, for example in an actuation unit or in a shock absorber.

The sensor arrangement according to aspects of the invention and the method are intended for use in all technical areas in which rotational or translational movements are intended to be detected and a relative position between an encoder and a sensor is intended to be simultaneously detected, in particular. In this case, the sensor arrangement according to aspects of the invention and the method are particularly preferably suitable for the use of particularly cost-effective encoders with scale subdivision errors which are relatively large on average. In particular, on account of their precision, robustness and reliability, the sensor arrangement according to aspects of the invention and the method are intended for use in safety-critical fields of use and for safety-critical applications, particularly preferably for use in motor vehicles, very particularly preferably in motor vehicle braking and control systems.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures:

FIG. 1 schematically shows two sensor arrangement examples which are in the form of wheel rotational speed detection systems according to the prior art, FIG. 2 schematically shows an exemplary embodiment of a sensor arrangement in the form of a wheel rotational speed detection system, FIG. 3 schematically shows the exemplary generation of a sensor output signal and the signal pattern of the latter, FIG. 4 schematically shows an exemplary encoder scale having scale subdivisions of different lengths and a correspondingly generated sensor output signal, FIG. 5 schematically shows an exemplary sensor output signal comprising individual counting pulses and an item of position information coded using the period duration, FIGS. 6-8 schematically show exemplary position codings using scale subdivisions of different lengths, FIG. 9 schematically shows two exemplary designs of two respective magnetic field sensor elements on a common chip, and FIG. 10 schematically shows an exemplary embodiment of two magnetic field sensor elements which are arranged at different distances from the scale of the encoder.

DETAILED DESCRIPTION OF THE PREFERRED EMBODIMENTS

Figure 1:
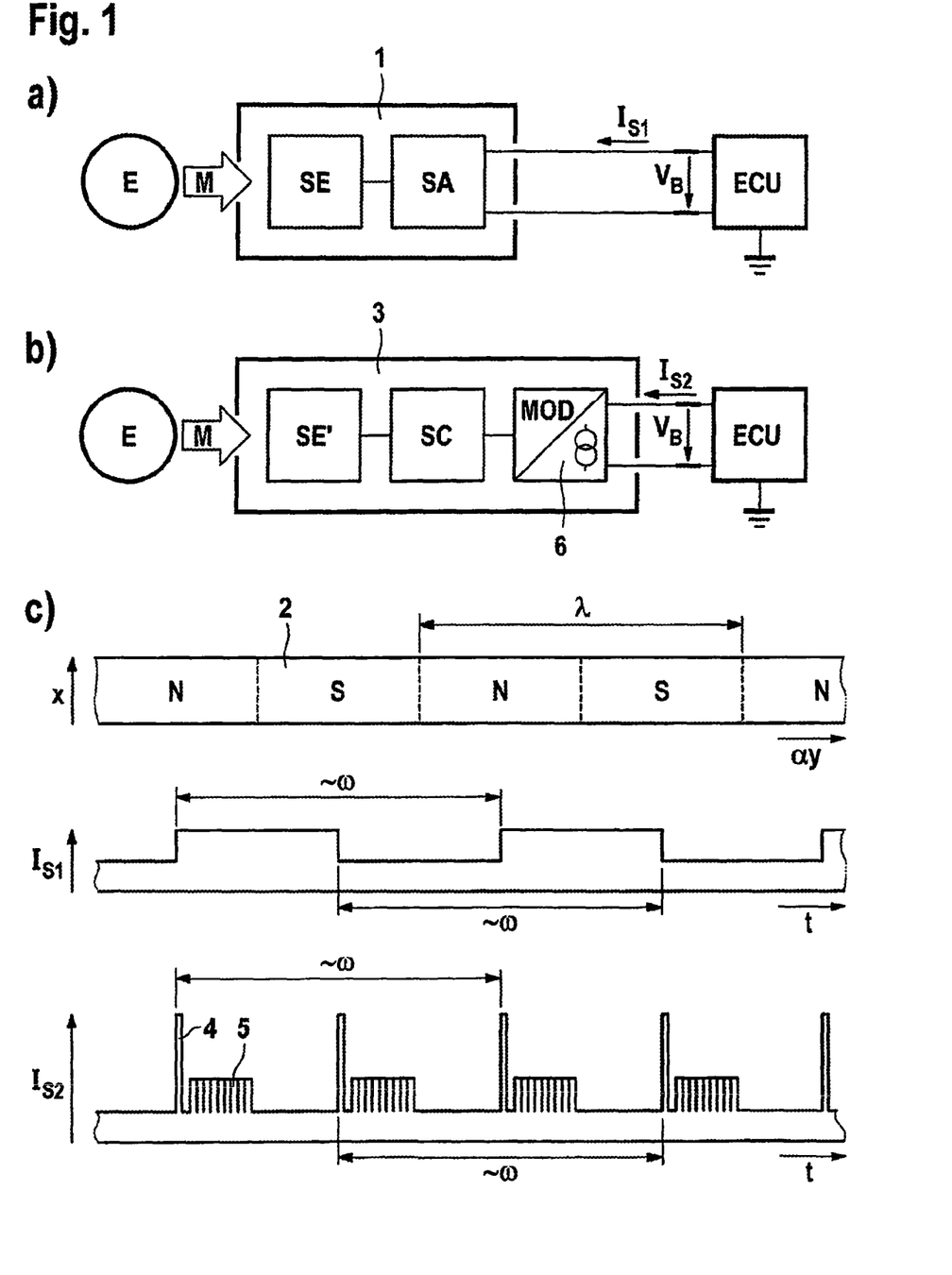

FIG. 1 illustrates two exemplary known wheel rotational speed detection systems including their important components and signals. In this case, FIG. 1 *a*) shows an active sensor 1 which is coupled to an alternately magnetized encoder E via a magnetic air gap M and is also connected to an electronic control unit ECU of a motor vehicle control system by means of two lines. The ECU supplies the active sensor 1 with electrical power using the operating voltage VB. The encoder E is permanently connected to a wheel of a motor vehicle. The sensor element SE detects the magnetic field modulated by the encoder E, and the sensor element output signal is conditioned in a signal evaluation stage SA and the sensor output signal $I_{S1}$ is generated in the form of an essentially periodic current signal whose signal profile maps the encoder movements or the detected scale subdivisions of the encoder. FIG. 1 *b*) depicts an exemplary embodiment which is developed and has a sensor 3 which likewise comprises a signal evaluation stage SC. The latter drives a modulator MOD which uses a current source 6 to generate a sensor output signal $I_{S2}$, which is illustrated in FIG. 1 c), in the form of an injected current having the mapped signal pattern. This signal pattern has counting pulses 4 which map the detection of the individual poles of the alternately magnetized encoder track 2 and are each generated at the times of the rising and falling edges of the signal generated by the signal evaluation stage SC. This essentially corresponds to the sensor output signal $I_{S1}$ from the sensor arrangement depicted in FIG. 1 a) and comprises a respective pulse for each scale subdivision λ or for each north/south pole pair of the encoder track 2, the wheel rotational speed ω being able to be calculated from the temporal offset between said pulse and the following pulse. The wheel rotational speed or the movement speed of the encoder E of the sensor output signal $I_{S2}$ is calculated, from the signal pattern described above, from the duration of two signal periods of the sensor output signal $I_{S2}$ which also transmits additional information 5 in the pulse pauses.

Figure 2:
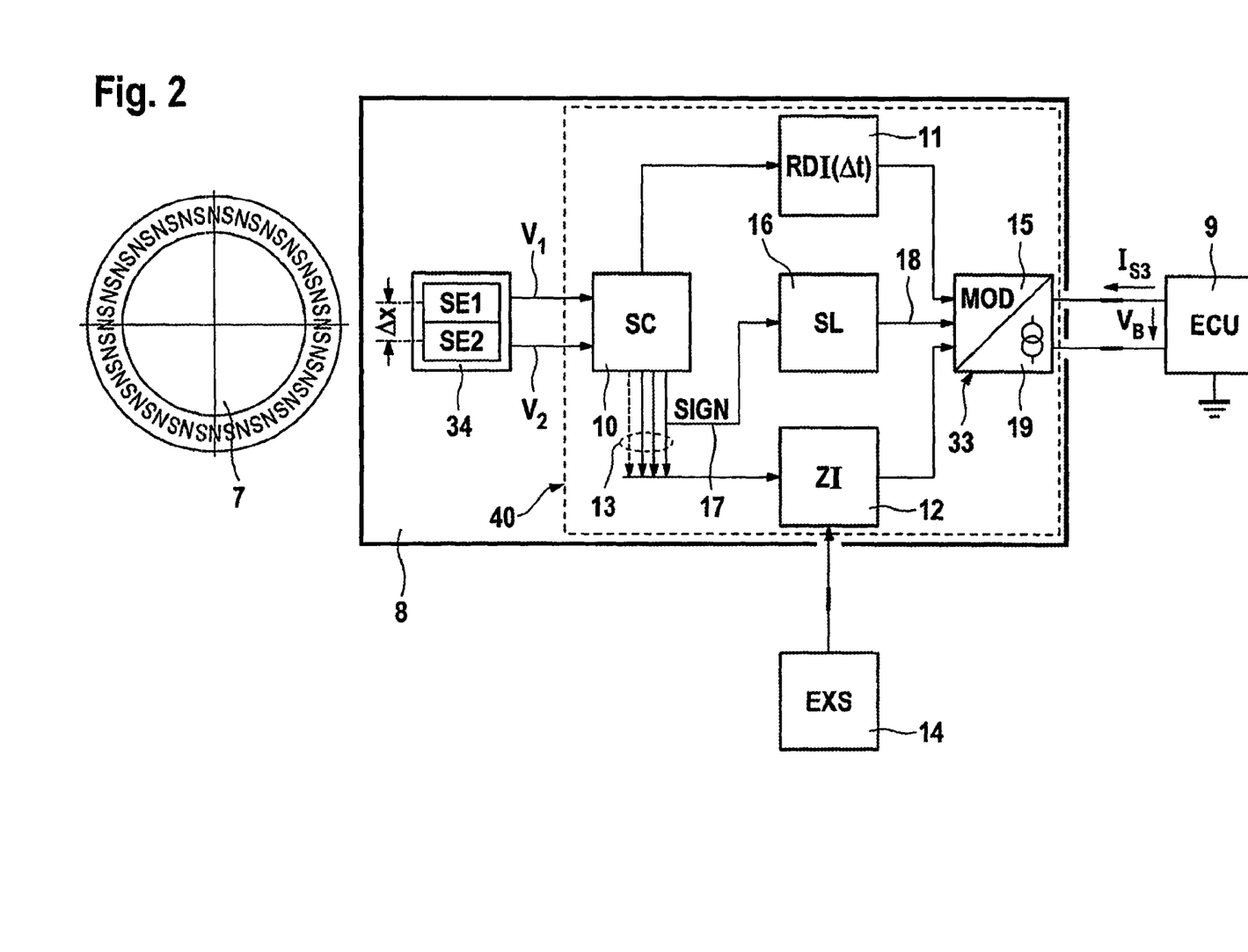

FIG. 2 shows an exemplary embodiment of a sensor arrangement comprising a magnetic encoder 7, which is permanently connected to a wheel and has an essentially circular scale with scale subdivisions which are in the form of alternating north/south pole pairs, a sensor 8 and an electronic control unit (ECU) 9 of a motor vehicle control system. The sensor 8 comprises two magnetic field sensor elements SE1 and SE2 which are in the form of anisotropic magnetoresistive sensor elements, for example, which are arranged such that they are offset with respect to one another by a defined distance Δx in the direction of movement of the encoder 7. Alternatively, by way of example, this defined distance may also be a multiple of the scale subdivision length λ plus the offset Δx which is less than λ, but this is not illustrated. Since the defined distance Δx is less than λ, the magnetic field sensor elements SE1 and SE2 are arranged, by way of example, in a common magnetic field sensor element module 34. The output signals $V_1, V_2$ from this module 34 or from the magnetic field sensor elements SE1, SE2 are transmitted to a signal processing circuit 40 which generates the sensor output signal $I_{S3}$. The sensor 8 is connected to the ECU 9 by means of two electrical lines, for example, and is supplied with electrical power, illustrated by the supply voltage VB, by the ECU 9 by means of these two lines. The signal processing circuit 40 comprises a signal conditioning unit 10, a counting pulse unit 11, an additional information unit 12, a movement direction unit 16 and an interface module 33. The sensor 8 also has an additional input which is used by an external signal source (EXS) 14 to provide an item of additional information which is transmitted to the additional information unit 12. A respective movement signal which comprises a movement pulse of a defined amplitude for each scale subdivision detected, the duration of which is determined by the exceeding and undershooting of a defined amplitude threshold of the respective magnetic field sensor element output signal and thus respectively depends on the movement speed of the encoder 7, is generated in the signal conditioning unit 10 from the two magnetic field sensor element output signals. The signal conditioning unit 10 also generates additional information 13 from the magnetic field sensor element output signals. In this case, an item of movement direction information is transmitted to the movement direction unit 16 in the form of a mathematical sign signal 17. The other additional information 13 is transmitted to the additional information unit 12 which uses the binary additional information to generate successive additional information pulses of a defined second amplitude and duration. The counting pulse unit 11 processes the two movement signals further by respectively generating a counting pulse of a defined first amplitude and defined duration for each signal period of each movement signal at the time of the rising edge and the falling edge of the respective movement signal. The two counting pulses of the two sensor elements, which can be respectively assigned with regard to the detection of a scale subdivision or a north or south pole, have been respectively shifted relative to one another by a time difference which depends on the movement speed of the encoder 7. This relative-speed-dependent time difference results from the defined distance Δx between the two magnetic field sensor elements SE1 and SE2 and does not depend on the respective length of the scale subdivisions. Although the encoder which is used by way of example has an average scale subdivision error of below 2%, which is conventional for wheel rotational speed detection systems, the sensor output signals from wheel rotational speed detection systems are normally encumbered with a measurement error resulting from this scale subdivision error and the wheel rotational speed calculated is accordingly incorrect. The sensor output signal $I_{S3}$ generated in the interface module 33 comprises a speed signal which has an item of speed information on the basis of this relative-speed-dependent time difference, and so this speed information is not encumbered with the error or measurement error resulting from the scale subdivision error explained above. The interface module 33 comprises a modulator 15 and a current source 19, the modulator 15 driving the current source 19 on the basis of the outputs from the counting pulse unit 11, the additional information unit 12 and the movement direction unit 16 and generating the sensor output signal $I_{S3}$ in the form of an injected current signal which is transmitted to the electronic control unit 9. By way of example, the sensor output signal $I_{S3}$ comprises an essentially periodic signal pattern having a first counting pulse and a second counting pulse of a defined first amplitude and defined duration for each period, the first and second counting pulses alternately resulting from a respective counting pulse, which is generated from the movement signal in the counting pulse unit 11 and is assigned to the output signal from the first magnetic field sensor element SE1, and a counting pulse which is generated from the other movement signal and is assigned to the other magnetic field sensor element output signal. On the basis of a direction of rotation signal 18 from the movement direction unit 16, the output signal from the additional information unit 12 in the form of the above-described additional information pulses of a second amplitude follows the respective lagging counting pulse in the respective pulse pause before the first counting pulse of the following period. The speed of rotation or rotational speed of the encoder, which is not encumbered with the scale subdivision error, is respectively calculated in the ECU, for each period of the sensor output signal $I_{S3}$, from the time difference or phase shift Δt between the first counting pulse and the lagging, second counting pulse. An item of position information or the angle of rotation information for the respectively detected scale subdivision, which is assigned a specific angle of rotation, is also calculated from the respective period duration which depends on the respective scale subdivision length.

Figure 3:
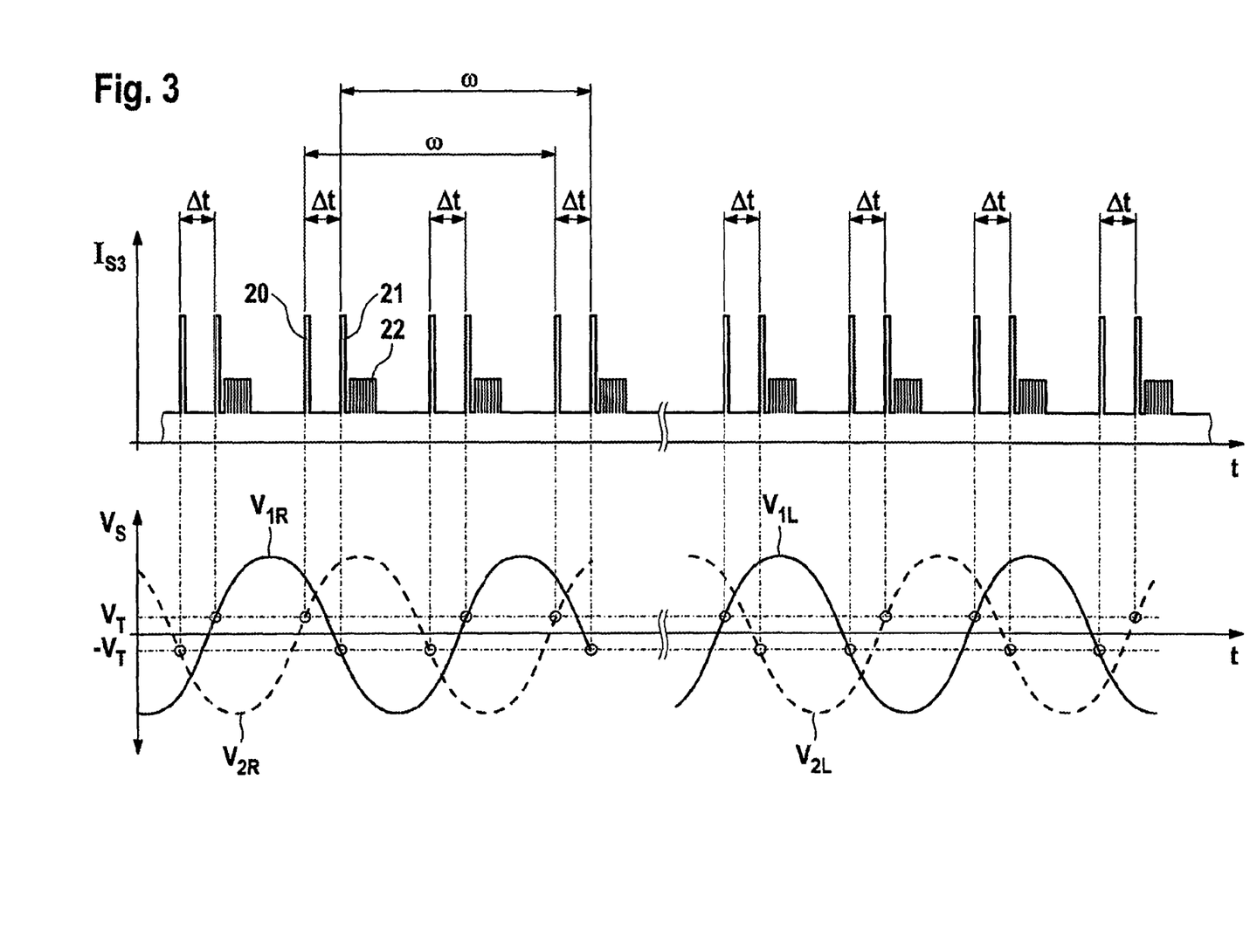

FIG. 3 illustrates, by way of example, the generation of the sensor output signal $I_{S3}$ and the signal pattern of the latter. The bottom part of the figure illustrates the function Vs(t) which comprises the magnetic field sensor element output signals $V_1$ and $V_2$ corresponding to a movement to the left (index L) and a movement to the right (index R) by the encoder. If the amplitude or trigger thresholds $V_T$ and $-V_t$ are exceeded and undershot, a counting pulse 20, for example assigned to the signal $V_{2R}$, and a counting pulse 21, for example assigned to the signal $V_{1R}$, are respectively generated by the signal processing circuit on the basis of the direction of movement of the encoder.

Counting pulses 20 and 21 are thus generated, by way of example, every half-cycle both on the basis of V1 and on the basis of V2 when the upper and lower trigger thresholds are alternately crossed, a time difference Δt which is a measure of the relative speed or speed of rotation of an encoder occurring between two identical edges of the counting pulses 20, 21. Another special feature of the exemplary signal pattern of the sensor output signal Is3 is that an additional information signal 22 comprising bit-coded additional information is always combined only with the counting pulse 21 which, for its part, always lags the counting pulse 20 even though a lagging signal pulse is produced either from V1 or from V2 depending on the relative direction of movement or direction of rotation of the encoder. As illustrated in FIG. 2, the movement direction unit 16 is therefore provided by way of example, which unit uses the movement direction information 17 to drive the modulator 15 in such a manner that the additional information is always combined with the counting pulse 21 derived from the respective lagging channel or is transmitted following said pulse.

The relative speed between the encoder and the sensor can be calculated from the mapped sensor output signal or the speed signal by evaluating the relative-speed-dependent time difference $\Delta t$. Additional information is obtained from the additional information signal 22 or the additional signal pulses in the ECU. The position information for the respectively detected scale subdivision can be calculated or assigned from the time $\omega$, which corresponds to twice the period duration, for example, taking into account a scale subdivision error characteristic variable which is allocated to each scale subdivision and results from a respective scale subdivision error.

Figure 4:
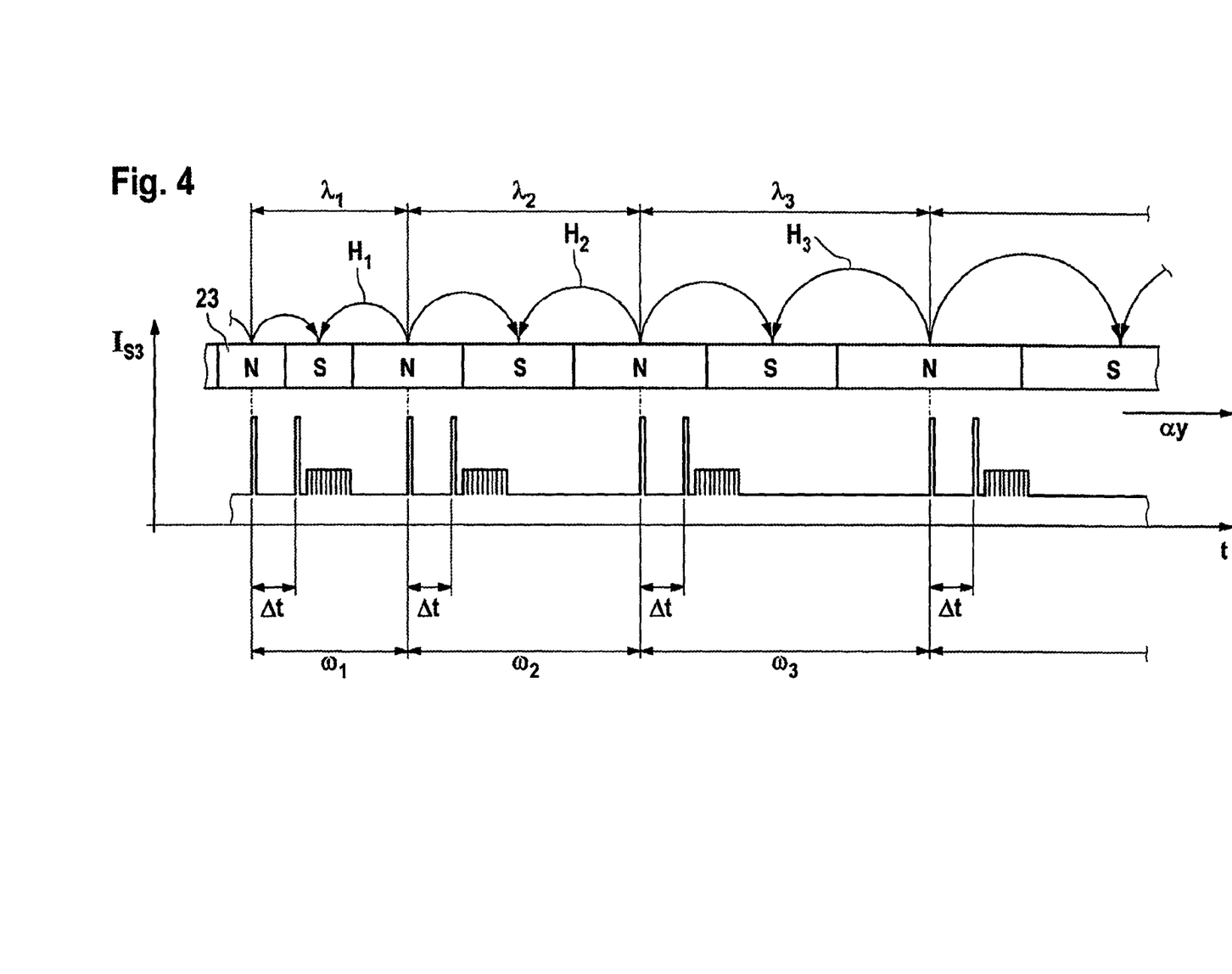

FIG. 4 shows an exemplary scale 23 of an encoder, having scale subdivisions of different lengths $\lambda_1, \lambda_2$ which are used to code position information. The sensor output signal $I_{S3}$ results, for example, in a similar manner to that described using FIG. 3. However, the respective period durations $\omega_1, \omega_2$ result both according to the different scale subdivision lengths $\lambda_1, \lambda_2$ and from the fact that a signal period or, based on the scale subdivision, a half-period is suppressed or is not generated on the sensor side.

Figure 5:
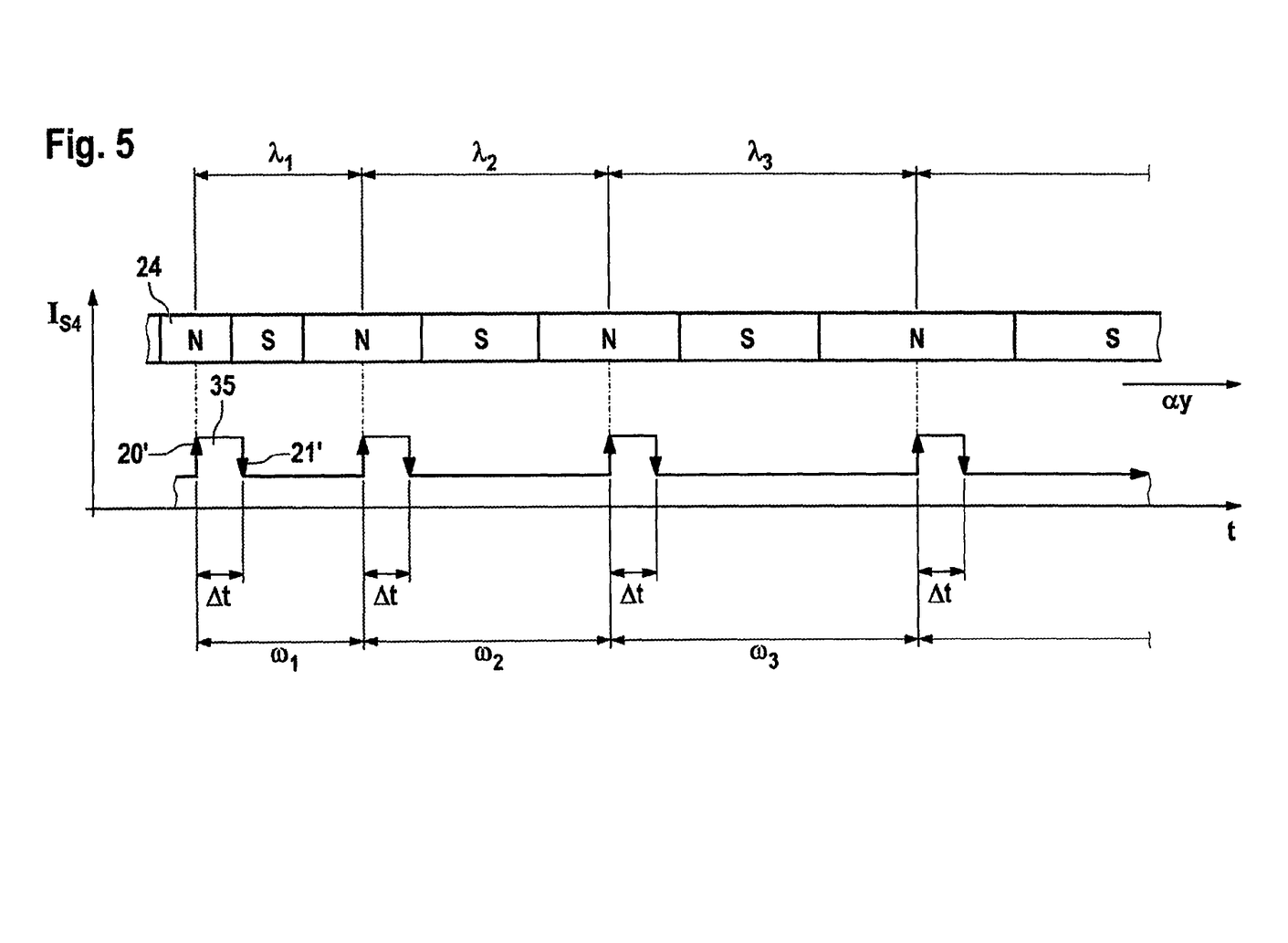

FIG. 5 likewise depicts an exemplary scale 24 of an encoder, having scale subdivisions of different lengths $\lambda_1, \lambda_2$ which are used to code position information. However, a sensor output signal $I_{S4}$ having an individual counting pulse 35 whose rising edge 20' and falling edge 21' are determined from the trigger thresholds shown in FIG. 3 is generated, for example, from the sensor output signals. This signal pattern is independent of the relative direction of movement. The duration of the individual counting pulse 35 depends on the relative-speed-dependent time difference. The relative speed is calculated from this duration of the individual counting pulse 35 in the ECU and an item of position information is determined from the period duration.

Figure 6:
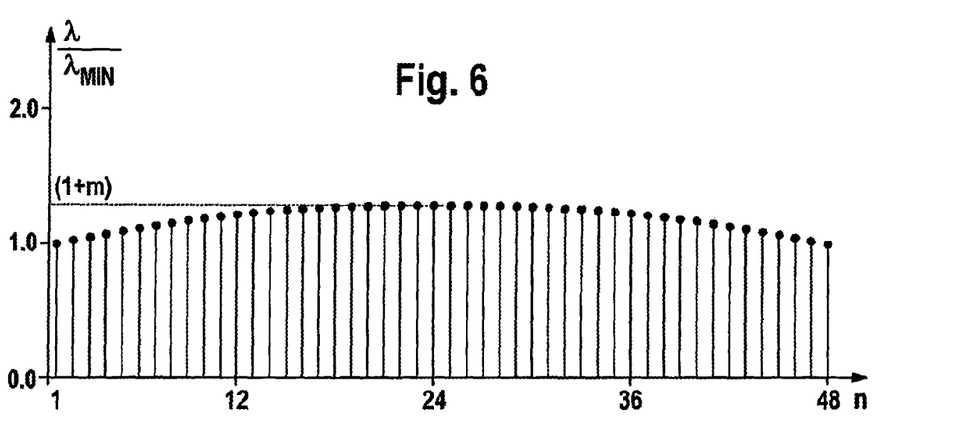
Figure 7:
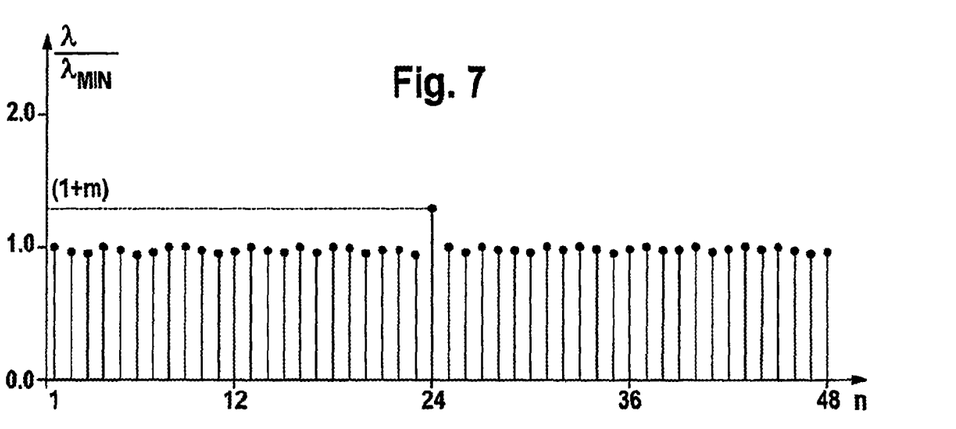
Figure 8:
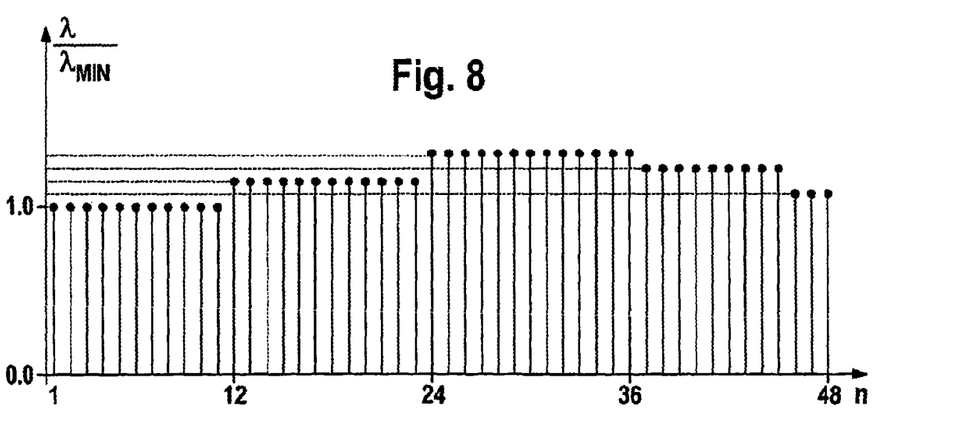

FIGS. 6, 7 and 8 use three examples to illustrate different position codings using scale subdivisions of different lengths. In this case, FIG. 6 shows a position coding using the scale subdivision lengths or a $\lambda$-coding with respect to a standardized scale subdivision length according to the general function $\lambda/\lambda\min=f(n)$, this function being defined, for example, as $\lambda/\lambda\min=1+m*\sin(n*3.75°)$, where n=1 to 48 and m=0.3. In this case, $\lambda\min$ defines the shortest scale subdivision and n defines the number of scale subdivisions. Furthermore, $\lambda\min$ is 3.5 mm, for example. In this case, an evaluation as a function of the scale subdivision lengths $\lambda/\lambda\min$ which have been passed through is carried out in the ECU in possible combination with the evaluation of the pole pitch field strengths H/Hmin which have been passed through, taking into account the gradients $d(\omega/\omega\min)/dn$ and $d(H/H\min)/dn$ and the direction of movement of the encoder. In the example in FIG. 7, the scale of the encoder has an individual index or a reference position coding in the form of a long scale subdivision. The other positions or scale subdivisions of the encoder are determined incrementally, for example, on the basis of this reference position. A scale subdivision error characteristic variable which is taken into account in the ECU when calculating the period duration and hence an item of position information can be advantageously allocated to the other scale subdivisions on the basis of this reference position using a table. FIG. 8 shows, as an exemplary embodiment, the $\lambda$-absolute value coding of different angular zones or different cohesive groups of scale subdivisions of an encoder, as is useful for engine controllers, for example. The individual angular zone areas and the crossing of the angular zone boundaries are biuniquely coded using different scale subdivision lengths $\lambda/\lambda\min$ and can be directly detected, in a manner which is true to the direction of rotation, by means of the associated $\omega/\omega\min$ evaluation, the rotational speed being able to be measured at the same time and independently of this by means of a $\Delta t$ evaluation.

Figure 9:
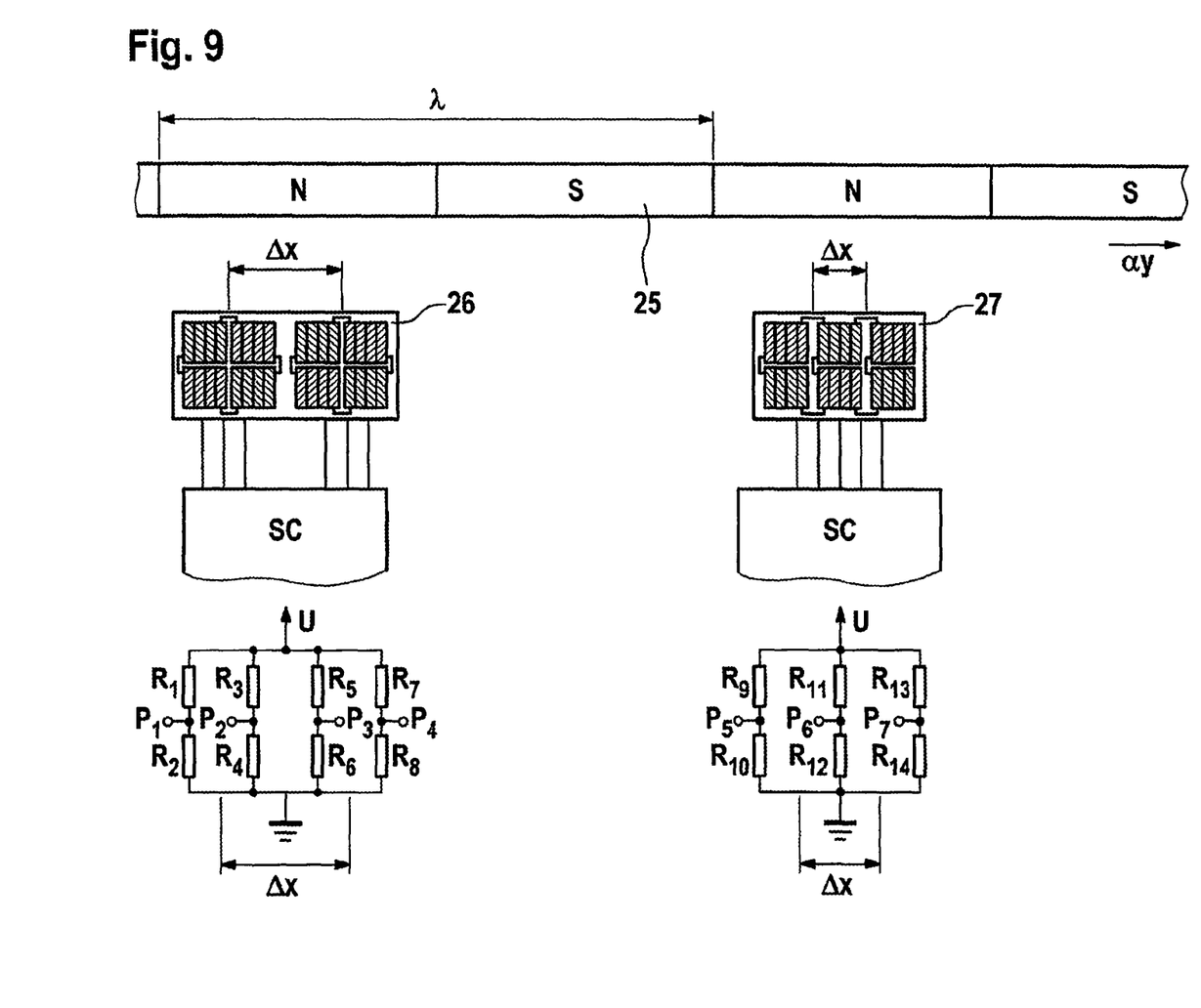

FIG. 9 shows two exemplary embodiments of magnetic field sensor elements SE1, SE2 on a common chip using magnetoresistive structures 26, 27 and the handling of an encoder scale 25 which moves relative to the stationary sensor element structures 26, 27 in the direction of movement $\alpha y$ at a reading distance. The sensory elements of the two structures are arranged with respect to one another in such a manner that their reading points are arranged such that they are offset with respect to one another by the difference in location $\Delta x$ in the direction of movement of the encoder track, $\Delta x$ being selected to be smaller than an N/S subdivision period or scale subdivision length $\lambda$ of the encoder. The structure 26 comprises four sections and acts as two magnetoresistive (MR) full-bridges R1, R2, R3, R4 with signal outputs P1, P2 and R5, R6, R7, R8 with signal outputs P3, P4. The reading points of the bridges are between the bridge sections. Their difference in location is identical to $\Delta x$. An alternative exemplary embodiment is the structure 27 which has three sections and is operated as two MR full-bridges R9, R10, R11, R12 with signal outputs P5, P6 and R11, R12, R13, R14 with signal outputs P6, P7, which are coupled to one another by means of the central section R11, R12 and the signal output P6. As described above, the reading points of the bridges are between the bridge sections. In this version, their difference in location $\Delta x$ can be configured to be smaller than in the four-section version. By way of example, series-connected MR strip resistors of the bridge elements R1 to R8 or R9 to R14 are either in the form of meandering resistors which are locally delimited from one another or are locally interleaved in one another in a sheet-like manner if required. Alternatively, these MR strip resistors are formed, for example, with or without a superimposed barber pole structure depending on the application requirement.

Figure 10:
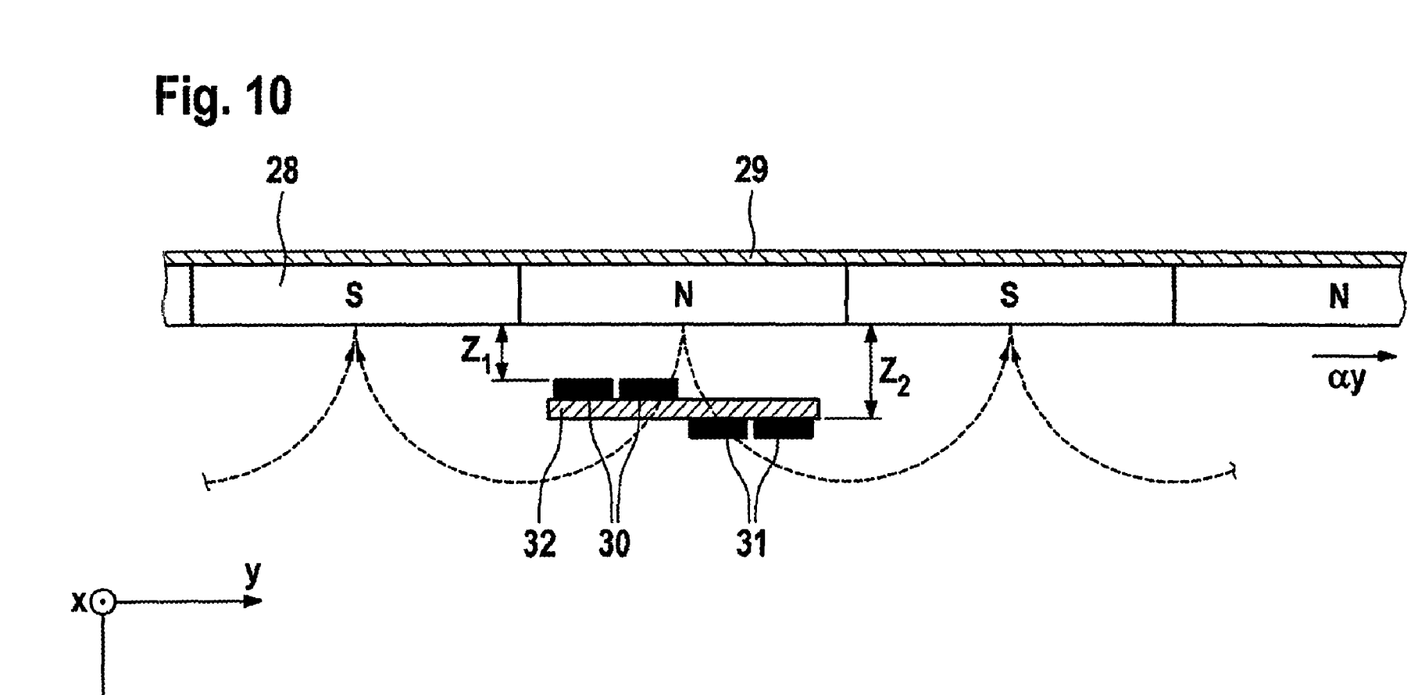

FIG. 10 shows an exemplary embodiment of two magnetic field sensor elements 30, 31, which are arranged at different distances from the scale of the encoder, according to an implementation with bridge structures as shown in FIG. 9. The structure 26, which is symbolized in this case as a side view, is arranged and formed by two respective bridge sections 30, 31 on the basis of AMR (anisotropic magnetoresistive) elements for operating two sensory paths with different air gaps Z1, Z2 with respect to the encoder 28, the encoder 28 additionally being formed with a magnetic yoke 29, for example. The bridge structures are applied to a carrier 32. The difference between the air gap distances (Z2-Z1) is always selected in such a manner that magnetic overloading of the sensory channel associated with Z2 is precluded if Z1 is selected to be >=0.5 mm.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A sensor arrangement for detection of relative movement between an encoder and a sensor, said sensor arrangement comprising:
   an encoder having an incremental scale defining a plurality of scale subdivisions (A), and
   a sensor which is magnetically coupled to the encoder via an air gap and comprises at least two magnetic field sensor elements which are arranged offset with respect to one another by a defined distance ($\Delta x$) in a direction of the relative movement,
   output signals ($V_1$, $V_2$) of the magnetic field sensor elements having been shifted relative to one another by a relative-speed-dependent time difference with regard to detection of a scale subdivision ($\lambda$) or a defined part of a scale subdivision (N,S),
   wherein the sensor includes a signal processing circuit which comprises an interface module that generates a sensor output signal ($I_{S3}$,$I_{S4}$) comprising at least one speed signal on the basis of the time difference,
   wherein the signal processing circuit comprises a signal conditioning unit which generates at least one respective movement signal from the magnetic field sensor element output signals ($V_1$,$V_2$),
   wherein the interface module comprises a modulator and at least one current source, the modulator being configured to drive the at least one current source at least on the basis of the movement signals and generating the sensor output signal ($I_{S3}$,$I_{S4}$) in the form of a substantially periodic injected current signal having two counting pulses for each signal period, which counting pulses are each generated from the movement signals in a counting pulse unit and a temporal offset ($\Delta t$) of which, from a rising edge of a first counting pulse to a rising edge of a second counting pulse, depends on the relative-speed-dependent time difference between the magnetic field sensor element output signals ($V_1$,$V_2$),
   wherein the signal processing circuit has a movement direction unit which drives the modulator of the interface module on the basis of the movement direction information provided by the signal conditioning unit in such a manner that an additional information signal generated from at least one item of additional information in an additional information unit follows the second, lagging counting pulse at a defined interval of time irrespective of the direction of movement of the encoder and irrespective of the order, which is generated thereby, of the two counting pulses generated from the magnetic field sensor element output signals ($V_1$,$V_2$).

2. The sensor arrangement as claimed in claim 1, wherein the incremental scale of the encoder has at least one scale subdivision of a defined length for coding an item of position information, said defined length differing from a length of other scale subdivisions of the encoder.

3. The sensor arrangement as claimed in claim 1, wherein the sensor is connected to an electronic control unit (ECU) by means of at least two lines.

4. The sensor arrangement as claimed in claim 3, wherein the sensor is supplied with electrical power by the at least two lines.

5. The sensor arrangement as claimed in claim 1, wherein the lengths of the scale subdivisions ($\lambda$) are different depending on the location in the direction of relative movement.

6. The sensor arrangement as claimed in claim 1, wherein the signal conditioning unit also generates at least one of the following items of additional information from at least one of the magnetic field sensor element output signals ($V_1$,$V_2$) and provides it for further processing: (i) an item of movement direction information, (ii) an item of information relating to magnetic field strength in the air gap, (iii) a self-diagnosis parameter, or (iv) any combination thereof.

7. The sensor arrangement as claimed in claim 1, wherein the interface module additionally generates the sensor output signal ($I_{S3}$,$I_{S4}$) on the basis of additional information pulses of a defined time duration or additional information pulse pauses of a defined time duration being generated at defined times for each signal period on the basis of a binary value of the additional information in the pulse pause between the individual counting pulse and a counting pulse of a following signal period or in the pulse pause between the second counting pulse and a first counting pulse of the following signal period, an amplitude of the additional information pulses differing from the amplitude of the counting pulses.

8. The sensor arrangement as claimed in claim 1, wherein the at least two magnetic field sensor elements (SE1, SE2) are anisotropic magnetoresistive sensor elements and the sensor additionally has at least one bias magnet, and in that, with reference to a spatial cartesian coordinate system (x,y,z), a scale area of the encoder which is detected by the sensor is arranged substantially parallel to an x-y plane, a magnetization direction of the bias magnet is arranged substantially parallel to an x-axis, and a respective sensor area of the magnetic field sensor elements is arranged substantially parallel to an x-y plane, the magnetic field sensor elements being arranged at a distance from a scale surface which is different in a z-direction.

9. The use of a sensor arrangement as claimed in claim 1 in motor vehicles as a wheel rotational speed detection system.

10. A method for precise detection of relative movement between an encoder and a sensor in a sensor arrangement comprising an encoder, which has an incremental scale having a plurality of scale subdivisions ($\lambda$), and a sensor which is magnetically coupled to the encoder via an air gap and comprises at least two magnetic field sensor elements (SE1, SE2) which are arranged offset with respect to one another by a defined distance ($\Delta x$) in a direction of relative movement of the encoder, said method comprising the steps of:
   shifting output signals ($V_1$,$V_2$) of the magnetic field sensor elements relative to one another by a relative-speed-dependent time difference with regard to the detection of a scale subdivision ($\lambda$) or a defined part of a scale subdivision (N,S);
   generating an individual sensor output signal ($I_{S3}$,$I_{S4}$) comprising a speed signal pattern from the two magnetic field sensor element output signals ($V_1$,$V_2$) on the basis of the time difference using a signal processing circuit, wherein the step of generating the speed signal pattern for a respective signal period comprises generating a first counting pulse and a lagging, second counting pulse each with a defined amplitude and a defined duration by the signal processing circuit, when a first defined amplitude threshold ($V_T$) and a second defined amplitude threshold ($-V_T$) are exceeded and undershot in direct succession by a respective one of the magnetic field sensor element output signals ($V_1$,$V_2$) with respect to the relative-speed-dependent time difference; and coding additional information in the form of at least one additional information bit that is obtained from at least one of the magnetic field sensor element output signals ($V_1$,$V_2$) in the signal processing circuit, the at least one additional information bit being respectively coded, once for each signal period, in the form of successive additional information pulses with a defined second amplitude and a defined time duration or in the form of corresponding additional information pulse pulses in a pulse pause following a lagging, second counting pulse.

11. The method as claimed in claim 10, further comprising the step of transmitting the sensor output signal ($I_{S3}$,$I_{S4}$) in the form of an injected current signal, to an electronic control unit (ECU) to which the sensor is connected by means of at least two lines.

12. The method as claimed in claim 11, further comprising the step of calculating a relative speed between the encoder and the sensor in the electronic control unit (ECU), for each signal period of the sensor output signal ($I_{S3}$, $I_{S4}$), from a temporal offset between a first counting pulse and a lagging, second counting pulse or from a time duration ($\Delta t$) of an individual counting pulse.

13. The method as claimed in claim 11, wherein the sensor arrangement is in the form of a wheel rotational speed detection system, and a method for indirectly detecting a loss of tire pressure, which has recourse to the sensor output signal ($I_{S3}$, $I_{S4}$), is carried out in the electronic control unit.

14. The method as claimed in claim 10, further comprising the step of identifying the corresponding scale subdivision ($\lambda$) or a corresponding scale subdivision segment (N,S) of the encoder, the detection of which by the sensor can be assigned to the respective signal period, in the electronic control unit (ECU) from a respective period duration of the sensor output signal ($I_{S3}$, $I_{S4}$) and is used to generate an item of position information.

15. The method as claimed in claim 10, further comprising the steps of:
detecting a mean magnetic field strength in the air gap;
transmitting the mean magnetic field strength in the form of additional information, to the electronic control unit (ECU) in which an imaging error of the scale subdivision, with which the sensor output signal ($I_{S3}$,$I_{S4}$) is respectively encumbered with respect to one period,
determining the imaging error based upon the mean magnetic field strength in the air gap;
evaluating a reference characteristic curve which is stored electronically and indicates the relationship between the standardized air gap length and the imaging error and the standardized field strength; and
evaluating the respective period duration of the sensor output signal ($I_{S3}$,$I_{S4}$) to determine and/or calculate an item of position information taking into account the imaging error.

* * * * *